United States Patent
Knechtges

(10) Patent No.: US 9,139,171 B2
(45) Date of Patent: Sep. 22, 2015

(54) METHOD AND CONTROL DEVICE FOR STOPPING A MOTOR VEHICLE WITHOUT JOLTING

(75) Inventor: Josef Knechtges, Mayen (DE)

(73) Assignee: Lucas Automotive GmbH, Koblenz (DE)

( * ) Notice: Subject to any disclaimer, the term of this patent is extended or adjusted under 35 U.S.C. 154(b) by 826 days.

(21) Appl. No.: 12/374,701

(22) PCT Filed: Jul. 10, 2007

(86) PCT No.: PCT/EP2007/006121
§ 371 (c)(1),
(2), (4) Date: Jan. 22, 2009

(87) PCT Pub. No.: WO2008/011983
PCT Pub. Date: Jan. 31, 2008

(65) Prior Publication Data
US 2009/0273231 A1 Nov. 5, 2009

(30) Foreign Application Priority Data

Jul. 25, 2006 (DE) .......................... 10 2006 034 357

(51) Int. Cl.
| | |
|---|---|
| *B60T 8/00* | (2006.01) |
| *B60T 7/12* | (2006.01) |
| *B60T 8/1766* | (2006.01) |
| *B60T 8/48* | (2006.01) |

(52) U.S. Cl.
CPC ... *B60T 7/12* (2013.01); *B60T 8/00* (2013.01); *B60T 8/1766* (2013.01); *B60T 8/4872* (2013.01); *B60T 2230/04* (2013.01)

(58) Field of Classification Search
CPC .............................. B60T 8/00; B60T 2230/04
USPC ........................... 303/9.61, 11, 157, 177, 191
See application file for complete search history.

(56) References Cited

U.S. PATENT DOCUMENTS

| | | | |
|---|---|---|---|
| 6,053,584 A | 4/2000 | Schunck et al. | |
| 2004/0017106 A1* | 1/2004 | Aizawa et al. | 303/191 |
| 2007/0027604 A1 | 2/2007 | Cuevas et al. | |
| 2007/0182243 A1* | 8/2007 | Osborn et al. | 303/10 |
| 2008/0258543 A9* | 10/2008 | Reichle | 303/9.69 |

FOREIGN PATENT DOCUMENTS

| | | |
|---|---|---|
| DE | 19703688 A1 | 8/1998 |
| DE | 10131323 A1 | 5/2002 |
| DE | 10321158 A1 | 12/2004 |
| DE | 102005009738 A1 | 9/2006 |
| DE | 102005025852 A1 | 12/2006 |
| DE | 102005029891 A1 | 1/2007 |
| WO | WO 2005051737 A1 * | 6/2005 |

OTHER PUBLICATIONS

International Search Report for PCT/EP2007/006121 dated Jan. 21, 2008.

* cited by examiner

*Primary Examiner* — Anna Momper
(74) *Attorney, Agent, or Firm* — MacMillan, Sobanski & Todd, LLC

(57) ABSTRACT

A method of stopping a motor vehicle without jolting is described, which is characterized in that a sum of the hydraulic fluid pressures generated by a foot-force-actuable brake system and acting upon the braking devices of the motor vehicle during the stopping operation is reduced in a driver-independent manner by 30% to 70% in dependence upon a variable that is related to the vehicle velocity.

19 Claims, 2 Drawing Sheets

METHOD AND CONTROL DEVICE FOR STOPPING A MOTOR VEHICLE WITHOUT JOLTING

CROSS-REFERENCE TO RELATED APPLICATIONS

This application claims priority to International Patent Application No. PCT/EP2007/006121 filed Jul. 10, 2007, the disclosures of which are incorporated herein by reference in their entirety, and which claimed priority to German Patent Application No. 10 2006 034 357.3 filed Jul. 25, 2006, the disclosures of which are incorporated herein by reference in their entirety.

BACKGROUND OF THE INVENTION

The invention relates to a method of stopping a motor vehicle without jolting as well as to a control unit for such a method.

The functionality of jolt-free stopping ("soft stop") of a motor vehicle has hitherto been realized only in so-called electrohydraulic brake systems.

In an electrohydraulic or power-actuable brake system, the driver request at the brake pedal is detected by means of sensors and supplied in the form of electrical signals to an electronic controller that controls an electric brake pressure generator ("brake by wire" mode). In order even in the event of failure of the vehicle electrical system still to be able to brake the motor vehicle with a minimum deceleration, the electrohydraulic brake system additionally has a redundant hydraulic emergency braking functionality, which may act directly and without any kind of electronic control upon the brakes of the vehicle wheels. In the case of this hydraulic emergency braking functionality, in a conventional manner by means of a foot-force-actuable brake pressure generator and hydraulic lines a direct connection is established between the brake pedal and the wheel brakes of the motor vehicle ("push-through" mode).

In the case of the soft stop functionality, shortly before reaching the stationary state of the vehicle the pressure acting upon the wheel brakes is automatically reduced. Thus, the vehicle jolt that arises upon reaching the stationary state of the vehicle is at least minimized because the—compared to the sliding friction—higher static friction of the brake linings is compensated by a lower brake pressure. In the case of an electrohydraulic brake system, in the normal "brake-by-wire" mode the driver is uncoupled from the brake system because of the existence of the simulation piston. The soft stop functionality in an electrohydraulic brake system accordingly does not make itself felt in the response characteristic of the brake pedal.

An object of the present invention is to provide a soft stop functionality in a foot-force-actuable brake system.

BRIEF SUMMARY OF THE INVENTION

To achieve the object stated above, a first aspect of the invention provides a method of stopping a motor vehicle without jolting, whereby a sum of the hydraulic fluid pressures generated by a foot-force-actuable brake system and acting upon the braking devices of the motor vehicle during the stopping operation is reduced in a driver-independent manner by 30% to 70% in dependence upon a variable that is related to the vehicle velocity.

As a result of reducing the sum of the hydraulic fluid pressures acting upon the braking devices in dependence upon a variable that is related to the vehicle velocity, the vehicle jolt that arises upon reaching the stationary state of the motor vehicle may be perceptibly reduced. This is also connected with the fact that the transition from the sliding friction to the—compared to the sliding friction—higher static friction of the brake linings is compensated by means of the reduction of the hydraulic fluid pressures by 30% to 70%. Furthermore, the reduction of the hydraulic fluid pressures acting upon the braking devices occurs completely automatically, i.e. without any input by the driver. Preferably, the sum of the hydraulic fluid pressures may be reduced by 40% to 60%, even more preferably by 50%.

According to an aspect of the invention, the reduction of the sum of the hydraulic fluid pressures may moreover be dependent upon the dynamic axle load distribution. By including the dynamic axle load distribution it is possible, in the event of extreme braking deceleration, or in the event of braking manoeuvres on steep terrain, to relieve the front axle, which is more highly loaded than the rear axle, by reducing the hydraulic fluid pressures acting upon the braking devices of the front wheels to a greater extent than the hydraulic fluid pressures acting upon the braking devices of the rear wheels.

The variable that is related to the vehicle velocity (for example a wheel speed or the vehicle velocity itself) may according to a further aspect of the invention be compared with a threshold value. Thus, for example upon reaching or undershooting a velocity threshold value or a wheel speed threshold value, the sum of the hydraulic fluid pressures acting upon the braking devices of the motor vehicle is reduced.

According to a further development, the hydraulic fluid pressure acting upon a braking device of a front wheel and the hydraulic fluid pressure acting upon a braking device of a rear wheel may be reduced. Thus, only the hydraulic fluid pressure acting upon two diagonally opposite braking devices of the motor vehicle is reduced (for example completely reduced), while the hydraulic fluid pressure of the braking devices of the other two vehicle wheels remains unchanged and the driver of the vehicle may by means of these two braking devices still influence the deceleration of the motor vehicle during the soft stop functionality.

If the braking method is used in a motor vehicle having two diagonally extending brake circuits, i.e. in a motor vehicle, in which one brake circuit connects the braking device of one front wheel to the braking device of a rear wheel lying diagonally opposite and another brake circuit connects the braking device of the other front wheel to the braking device of the other rear wheel lying diagonally opposite, the hydraulic fluid pressure may be reduced in one of the two brake circuits. As the hydraulic fluid pressure is reduced in only one brake circuit and remains unchanged in the other brake circuit, the vehicle stability during braking of the motor vehicle is not impaired by the soft stop functionality.

According to a further development of the invention, the hydraulic fluid pressure in the braking device of a front wheel and in the braking device of a rear wheel may be reduced by 100%, i.e. completely. As a result, the sum of the hydraulic fluid pressures generated by the foot-force-actuable brake system and acting upon all of the braking devices of the motor vehicle is reduced by 50%.

The threshold value may be predetermined. As soon as for example the velocity of the motor vehicle reaches the threshold value, the hydraulic fluid pressure is reduced. The velocity threshold value may lie in a range of 1-5 kph, preferably in a range of 1-3 kph. Given such low velocities, the reduced hydraulic fluid pressure is still sufficient to brake the motor vehicle reliably up to attainment of the stationary state.

As an alternative to a predetermined threshold value, the threshold value may be dependent upon the velocity and/or the deceleration of the motor vehicle. If the motor vehicle is braked sharply, i.e. with a high braking deceleration, then for example the velocity threshold value may be increased as a function of the deceleration since higher brake forces are necessary for reliable braking of the motor vehicle and so the vehicle jolt arising upon attainment of the stationary state of the motor vehicle is far more pronounced. To combat this, the hydraulic fluid pressure is reduced already upon attainment and/or undershooting of the increased velocity threshold value. As a result, the period of time, during which the brake system is operated with reduced hydraulic fluid pressure, is constant because the braking deceleration in such a case is increased. Braking of the motor vehicle on a gradient is therefore likewise taken into account.

Furthermore, after the reduction of the sum of the hydraulic fluid pressures this sum may be increased in dependence upon a further velocity threshold value of the motor vehicle. Preferably, this further velocity threshold is reached upon attainment of the stationary state of the motor vehicle. Upon or after attainment of the stationary state, the hydraulic fluid pressure may be increased anew in the braking devices of the brake system, in which it was previously reduced, in order to summon up the brake forces needed for the stationary state. This is advantageous if the motor vehicle comes to a standstill for example on a gradient.

Furthermore, the sum of the hydraulic fluid pressures may be increased to a value that existed before it was reduced in the brake system. This additional functionality ensures that the entire hydraulic fluid pressure and hence the entire brake force of the brake system is once more available upon or after attainment of the stationary state of the motor vehicle and hence the state that existed prior to the response of the soft stop functionality is reached once more.

During the reduction of the sum of the hydraulic fluid pressures at least one of the braking devices may remain in fluidic connection with the actuating device. In this case, the driver still directly retains control of the braking operation.

A second aspect of the present invention provides a control unit for controlling hydraulic fluid pressures in a foot-force-actuable brake system of a motor vehicle, comprising a device for reducing a sum of the hydraulic fluid pressures generated by a foot-force-actuable brake system and acting upon the braking devices of the motor vehicle by 30% to 70% in dependence upon a velocity threshold value of the motor vehicle. This control unit guarantees a jolt-free stopping of a motor vehicle in the sense of the previously described braking method.

The control unit may further comprise a device for increasing the sum of the hydraulic fluid pressures in dependence upon a further velocity threshold value of the motor vehicle. Upon attainment of the further velocity threshold value, the sum of the hydraulic fluid pressures is increased anew, with the result that the brake force needed for the stationary state of the motor vehicle is available once more.

According to a further development, the control unit may be ABS- and/or ESP-capable. This not only increases the functionality of a brake system having the control unit, but the control unit may also control and interconnect the already existing ABS- and/or ESP-capable components in such a way that they are suitable for implementing the method described in accordance with the first aspect of the invention. The provision costs of such a brake system are therefore markedly reduced.

Other advantages of this invention will become apparent to those skilled in the art from the following detailed description of the preferred embodiments, when read in light of the accompanying drawings.

DETAILED DESCRIPTION OF THE INVENTION

Figure 1:
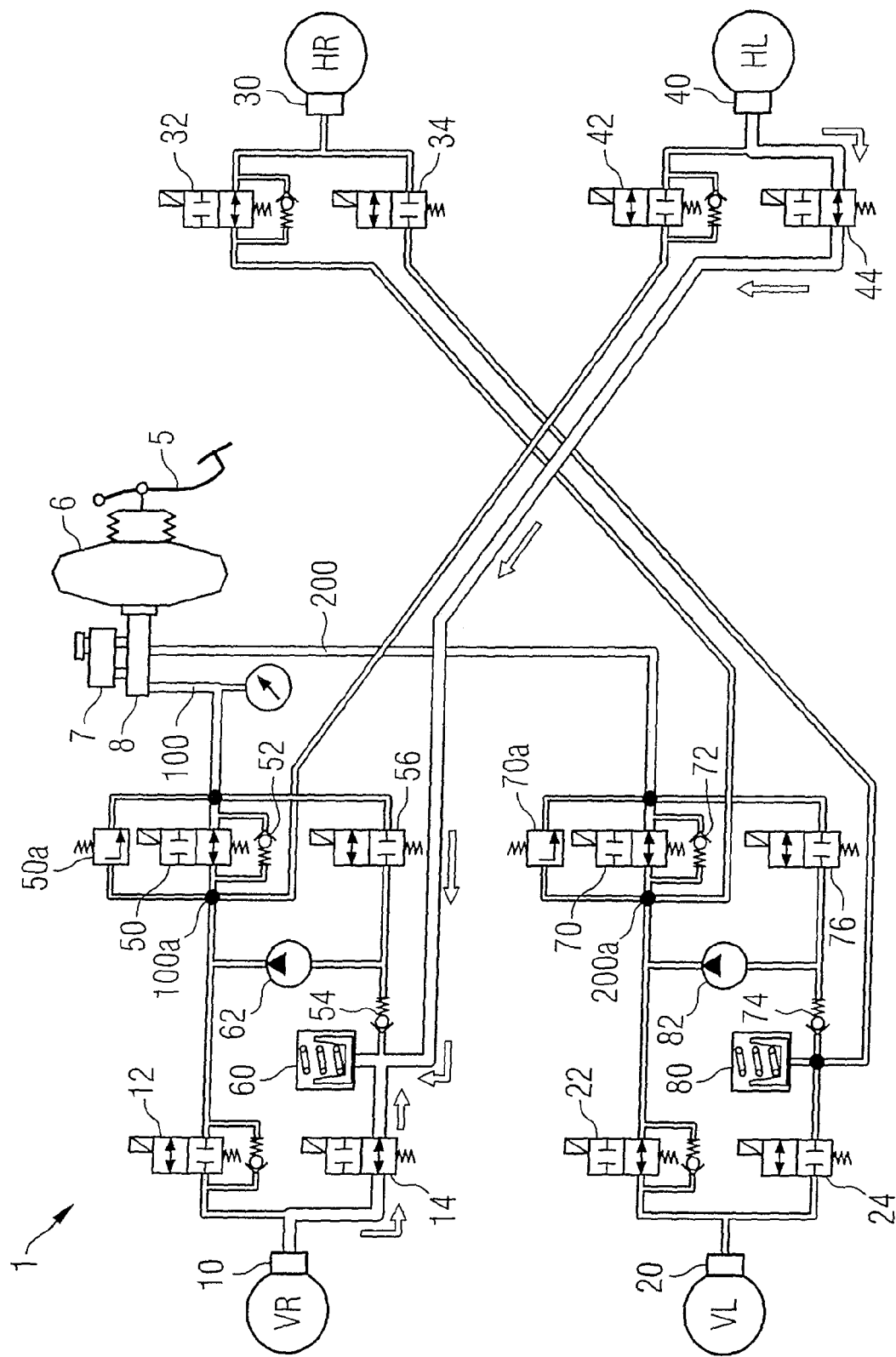
FIG. 1 is a diagrammatic representation of a brake system during a pressure reduction according to an embodiment of the braking method according to the invention.
Figure 2:
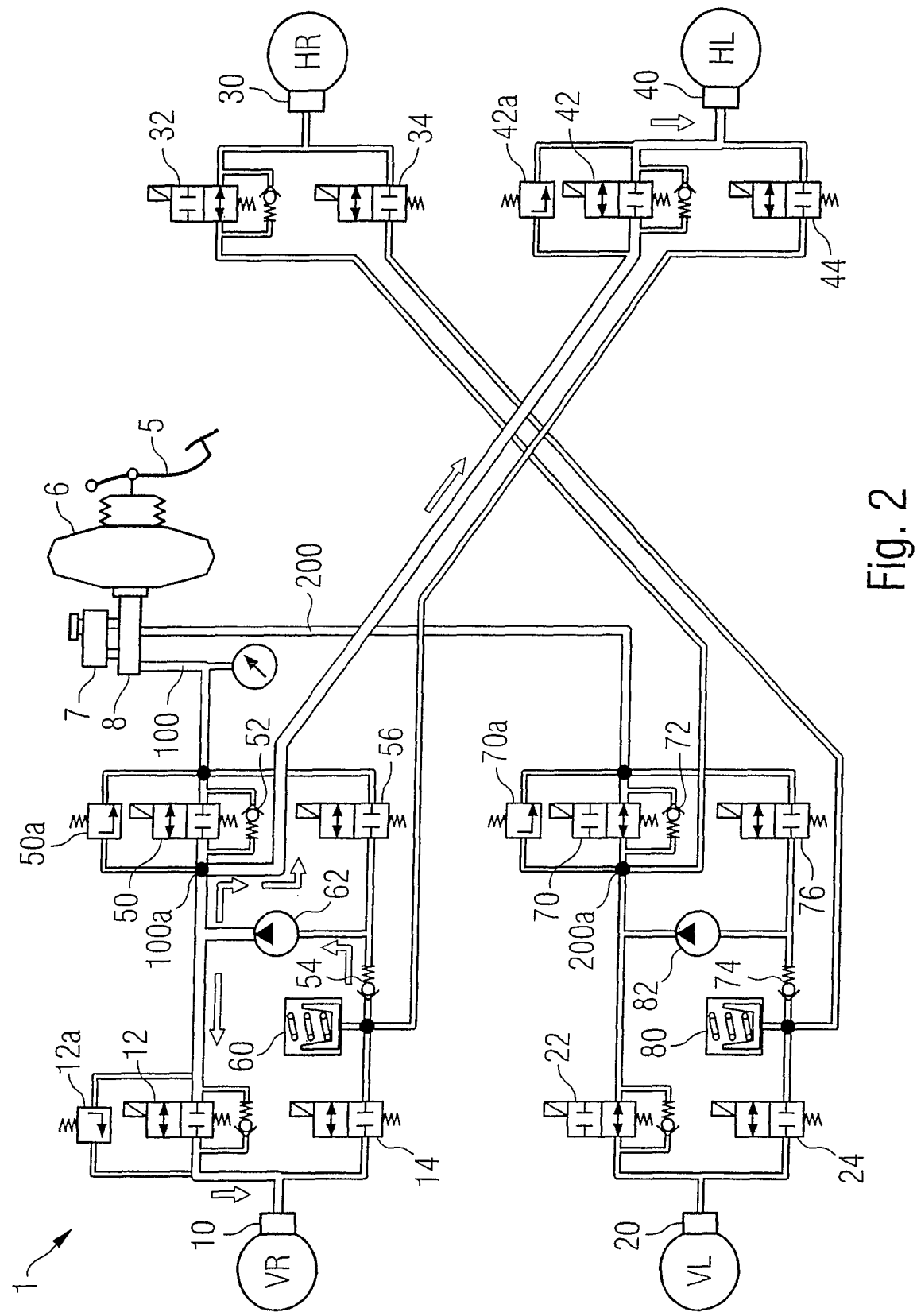
FIG. 2 is a diagrammatic representation of the brake system shown in FIG. 1 during a pressure build-up according to an embodiment of the braking method according to the invention.

In FIG. 1 and FIG. 2 there is diagrammatically represented an embodiment of a control unit, which is implemented in a brake system 1 and is suitable for effecting the method according to the invention of stopping a motor vehicle without jolting. In both representations, identical reference characters indicate identical components of the brake system 1. As FIG. 1 and FIG. 2 represent two different operating states of the same brake system 1, the structure and the individual components of the brake system 1 are described only with reference to FIG. 1.

The brake system 1 represented in FIG. 1 comprises two diagonally extending brake circuits 100, 200. The brake circuit 100 connects the braking device 10 of the front right vehicle wheel and the braking device 40 of the rear left vehicle wheel to a foot-force-actuable device 5, 6, 7, 8 for supplying pressurized hydraulic fluid. The brake circuit 200 connects the braking device 20 of the front left vehicle wheel and the braking device 30 of the rear right vehicle wheel to the device 5, 6, 7, 8. As a result of the diagonal distribution of the brake circuits 100, 200 the motor vehicle stability and the vehicle dynamics are improved in specific situations, for example if the track of the right vehicle wheels is situated on a wet road surface and the vehicle track of the left vehicle wheels is situated on a dry road surface.

As already mentioned, the brake system 1 has a foot-force-actuable device 5, 6, 7, 8 for supplying pressurized hydraulic fluid. This device comprises a brake pedal 5, a brake booster 6, and a master cylinder 8 disposed downstream of the brake booster 6 and connected to a reservoir 7 for hydraulic fluid.

With the exception of the foot-force-actuable device 5, 6, 7, 8, all of the components of the brake system 1 described in detail below are contained in a control unit. This control unit controls the sum of the hydraulic fluid pressures that are generated by the device 5, 6, 7, 8 and act upon the braking devices 10, 20, 30, 40 of the vehicle wheels.

Both brake circuits 100, 200 contain components that are normally used in ABS- and/or ESP-capable brake systems. Thus, in the brake circuit 100 there is disposed downstream of the master cylinder 8 an electromagnetically actuable control valve 50 that is open in the de-energized state. Associated with this control valve 50 and connected in parallel thereto is a non-return valve 52 that allows hydraulic fluid to be fed from the reservoir 7 to the braking device 10 and the braking device 40, and namely in the situation where the control valve may no longer be switched over from the closed state to the open state owing to an operational fault. Furthermore, the reference character 50a indicates the possibility of a pulse width modulation (PWM) of the control valve 50 that in the presently described embodiment allows hydraulic fluid to pass through the control valve back to the reservoir 7 if the hydraulic fluid pressure downstream of the control valve 50 exceeds the pressure in the master cylinder 8 (e.g. 50 bar) by for example more than 10 bar.

In the second diagonally extending brake circuit 200 there is likewise connected downstream of the master cylinder 8 a control valve 70, with which a non-return valve 72 is associated parallel thereto. Pulse width modulation of the control valve 70 is moreover possible, as indicated by the reference character 72*a*.

Associated with each braking device 10, 20, 30, 40 is an inlet valve 12, 22, 32, 42 and an outlet valve 14, 24, 34, 44. The inlet valves 12, 22, 32, 42 are electro-magnetically actuable control valves that are open in the de-energized state, while the outlet valves 14, 24, 34, 44 are electromagnetically actuable control valves that are closed in the de-energized state.

In both circuits 100, 200 an accumulator 60, 80 is connected downstream of the outlet valves 14, 24, 34, 44. Disposed downstream of the accumulator 60, 80 is a non-return valve 54, 74. For increasing pressure in the brake circuits 100, 200 a pump 62, 82 is provided, which may deliver hydraulic fluid from the accumulator 60, 80 through the inlet valves 12, 22, 32, 42 to the braking devices 10, 20, 30, 40. Downstream of the control valves 50, 70 branching points 100*a*, 200*a* are provided in the respective brake circuits 100, 200. Upon actuation of the brake pedal 5, these branching points 100*a*, 200*a* allow hydraulic fluid to be fed from the master cylinder 8 through the control valves 50, 70 simultaneously to the respective braking devices 10, 20 of a front wheel and the braking devices 30, 40 of a rear wheel.

In each of the two brake circuits 100, 200 a pump 62, 82 is provided, which feeds hydraulic fluid from the respective accumulators 60, 80 to the braking devices 10, 40 and 20, 30. The pumps 62, 82 in the embodiment represented here are designed for example as radial piston pumps that are coupled to one another by a common eccentric.

There are further disposed in both brake circuits 100, 200 in each case downstream of the non-return valves 54, 74 electromagnetically actuable control valves 56, 76, which upon actuation of the pumps 62, 82, may be kept closed in order to ensure that the pumps 62, 82 feed only hydraulic fluid from the accumulators 60, 80 to the respective braking devices 10, 40 and 20, 30. If for example the quantity of hydraulic fluid in the accumulator 60 is insufficient for the pressure build-up in the braking devices 10, 40 after attainment of the stationary state of the vehicle, then the control valve 56 may be opened for a short time, thereby allowing the pump 62 to feed hydraulic fluid from the master cylinder to the braking devices 10, 40.

There now follows a description of the mode of operation of the brake system in respect of stopping a motor vehicle without jolting (soft stop functionality). FIG. 1 describes a first phase, the pressure reduction, and FIG. 2 describes an optional second phase, the subsequent pressure build-up, of the soft stop functionality.

For this purpose, as is represented in FIG. 1, shortly before reaching the stationary state of the vehicle the hydraulic fluid pressure is completely reduced in the braking device 10 of the front right vehicle wheel and in the braking device 40 of the rear left vehicle wheel, i.e. the sum of the hydraulic fluid pressures generated by the device 5, 6, 7, 8 and acting upon the braking devices 10, 20, 30, 40 is reduced by 50%. The time, at which the hydraulic fluid pressure generated in the brake system 1 is reduced, is determined by a variable that is related to the vehicle velocity. In the embodiment described here, this variable related to the vehicle velocity is the vehicle velocity itself, which is compared with a velocity threshold value lying in the region of approximately 1-5 kph. As soon as the vehicle velocity has reached or dropped below the velocity value, the sum of the hydraulic fluid pressures acting upon the braking devices of the motor vehicle is reduced.

It is equally conceivable to make this velocity threshold value dependent upon the braking deceleration of the motor vehicle in order thereby to determine a variable velocity threshold value. By virtue of the variable velocity threshold value, given different braking decelerations the period of time between the start of the reduction of the hydraulic fluid pressure and the actual attainment of the stationary state of the motor vehicle is constant. This may be advantageous for example if the braking deceleration of the motor vehicle is correspondingly high, for example in the event of sharp braking of the motor vehicle, or if the motor vehicle is to be brought to a standstill on a gradient.

To reduce the pressure, the inlet valves 12, 42 are closed and the outlet valves 14, 44 are opened. By opening the outlet valves 14, 44 hydraulic fluid may flow from the braking devices 10, 40 back to the accumulator 60, with the result that the brake pressure in the braking devices 10, 40 is reduced. The non-return valve 54 in this case prevents the return flow of hydraulic fluid from passing into other regions of the brake circuit 100. The accumulator 60 is therefore loaded with hydraulic fluid, which is then available once more in a subsequent phase. Because the hydraulic fluid pressure is reduced only in the brake circuit 100, the driver of the motor vehicle is still able to influence the deceleration of the motor vehicle via the brake circuit 200 through actuation of the brake pedal 5. The brake pedal 5 is therefore not hard, as it would be if all of the inlet valves 12, 22, 32, 42 of both brake circuits 100, 200 were closed and the driver therefore no longer had any influence at all on the deceleration of the motor vehicle. The response characteristic of the brake pedal 5 is therefore unaltered compared to normal operation of the motor vehicle. Thus, a brake pedal 5 that is capable of modulation in terms of force and pedal displacement is still available to the driver.

Referring to FIG. 2 the optional second phase of the soft stop functionality is represented, during which after the pressure reduction of the first phase the hydraulic fluid pressure is increased once more in the braking devices 10, 40. For this purpose, the control valve 50 as well as the outlet valves 14, 44 are closed. If the pump 62 is then actuated, hydraulic fluid is fed from the accumulator 60 through the non-return valve 54 and through the pulse-width-modulated inlet valve 12, 42 to the braking devices 10, 40. The effect achieved by the pulse width modulation of the inlet valves 12, 42 is that the hydraulic fluid pressure downstream of the control valve 50, i.e. in the direction of the inlet valves 12, 42, is increased and so the non-return valve 52 remains closed because upstream of the non-return valve 54 a hydraulic fluid pressure at the level of the pressure in the master cylinder 8 prevails.

As a result of the pulse width modulation of the inlet valves 12, 42 the pressure in the region downstream of the control valve 50 should be approximately 5 bar higher than the hydraulic fluid pressure in the master cylinder 8 (e.g. 50 bar). Keeping the non-return valve 52 closed prevents hydraulic fluid from passing out of the master cylinder 8 through the non-return valve 52 and past the control valve 50 into the braking devices 10, 40, which would lead to a "floppy" brake pedal 5.

The control valve 50 is further operated with a pulse width modulation 50*a*, which in the event of an excess pressure downstream of the control valve 50 makes it possible for the hydraulic fluid to pass through the control valve 50 back to the master cylinder 8. In the embodiment of the brake system represented here, hydraulic fluid is let through the control valve 50 if the pressure downstream of the control valve 50 exceeds the pressure in the master cylinder 8 by more than 10 bar.

As a safety feature of the brake system 1 represented here, it is provided that the driver may at any time prevent the soft stop functionality from responding. For this purpose, the brake pedal is over-depressed, i.e. the brake pedal is fully depressed as far as a position, at which the control unit recognizes that the soft stop functionality is not wanted by the driver.

The vehicle velocity may, as described above, be compared with a velocity threshold value that may in turn be dependent upon the deceleration of the vehicle. It is further conceivable for the variable that is related to the vehicle velocity to be the wheel speed, which may be compared with a speed threshold value. Independently of whether the variable related to the vehicle velocity is compared with a velocity threshold value or with a wheel speed threshold value, the reduction of the sum of the hydraulic fluid pressures may still be dependent upon the dynamic axle load distribution. As a result of including the dynamic axle load distribution it is possible, given high braking deceleration, or given braking manoeuvres on steep terrain, to relieve the front axle, which is loaded to a greater extent than the rear axle, by reducing the hydraulic fluid pressure acting upon the braking devices of the front wheels to a greater extent than the hydraulic fluid pressure acting upon the braking devices of the rear wheels. In other words, the vehicle wheels of the rear axle are braked to a greater extent than the vehicle wheels of the front axle.

The person skilled in the art will appreciate that various modifications to the brake system represented in FIG. 1 and FIG. 2 are possible. Thus, for example, the individual brake circuits 100, 200 may connect the braking devices 10, 30 of the right vehicle wheels and the braking devices 20, 40 of the left vehicle wheels to the device 5, 6, 7, 8 for supplying pressurized hydraulic fluid. It is equally conceivable for the inlet valves 12, 22, 32, 42 and the outlet valves 14, 24, 34, 44, which are represented here and which correspond to 2/2-way solenoid valves, to be replaced by 3/3-way solenoid valves. Thus, a single 3/3-way solenoid valve could perform the function of one of the inlet valves 12, 22, 32, 42 and one of the outlet valves 14, 24, 34, 44.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Method of stopping a motor vehicle including a foot-force-actuable brake system that supplies pressurized hydraulic fluid to first and second brake circuits without jolting, each of the first and second brake circuits including at least two braking devices, the method comprising the steps of:
    (a) reducing hydraulic fluid pressure in the at least two braking devices of the first brake circuit such that a sum of the hydraulic fluid pressures generated by an actuation device of the foot-force-actuable brake system and acting upon braking devices of the first and second brake circuits during a stopping operation in a driver-independent manner is reduced by 30% to 70% in dependence upon a variable that is related to vehicle velocity; and
    (b) maintaining the hydraulic fluid pressure in the at least two braking devices of the second brake circuit unchanged by maintaining a fluidic connection between at least one of the braking devices in the second brake circuit and the foot-force actuation device during the reduction of the sum of the hydraulic fluid pressures in step (a).

2. Method according to claim 1, wherein the reduction of the sum of the hydraulic fluid pressures is additionally dependent upon a dynamic axle load distribution.

3. Method according to claim 1, wherein the variable that is related to the vehicle velocity is compared with a threshold value.

4. Method according to claim 3, the threshold value is a velocity threshold value and lies in a range of 1-5 kph.

5. Method according to claim 4, the velocity threshold value lies in a range of 1-3 kph.

6. Method according to claim 3, wherein the threshold value is a velocity threshold value which is dependent upon at least one of the velocity and the braking deceleration of the motor vehicle.

7. Method according to claim 1, wherein the reduction of hydraulic fluid pressures is by 40% to 60%.

8. Method according to claim 7, wherein the reduction of hydraulic fluid pressures is by 50%.

9. Method according to claim 1, the reduction of the sum of the hydraulic fluid pressures is achieved by reducing the hydraulic fluid pressure acting upon a braking device of a front wheel and a braking device of a rear wheel.

10. Method according to claim 1, wherein the reduction of the sum of the hydraulic fluid pressures is achieved by reducing only the hydraulic fluid pressure acting upon two diagonally opposite braking devices.

11. Method according to claim 10, wherein the hydraulic fluid pressure acting upon the two diagonally opposite braking devices is reduced by 100%.

12. Method according to claim 1, wherein after the reduction of the sum of the hydraulic fluid pressures the sum is increased.

13. Method according to claim 12, wherein the increase is carried out upon attainment of a stationary state of the motor vehicle.

14. Method according to claim 12, wherein the increase of sum of the hydraulic fluid pressures is to a value that existed prior to the reduction of the sum in the brake system.

15. Control unit for controlling hydraulic fluid pressures in a foot-force-actuable brake system that supplies pressurized hydraulic fluid to first and second brake circuits of a motor vehicle, each of the first and second brake circuits including at least two braking devices, the control unit comprising:
    a controller configured to reduce hydraulic fluid pressure in only the at least two braking devices of the first brake circuit such that a sum of the hydraulic fluid pressures generated by an actuation device of the foot-force-actuable brake system and acting upon braking devices of the first and second brake circuits during a stopping operation is reduced by 30% to 70% in dependence upon a variable related to vehicle velocity in such a way that during the reduction of the sum of the hydraulic fluid pressures, the hydraulic fluid pressure in the at least two braking devices of the second brake circuit is unchanged such that at least one of the braking devices of the second brake circuit remains in a fluidic connection with the foot-force actuation device.

16. Control unit according to claim 15, wherein the controller is further configured to increase the sum of the hydraulic fluid pressures.

17. Control unit according to claim 15, wherein the control unit is capable of performing at least one of Anti-lock Braking and Electronic Stability Control.

18. Control unit according to claim 15, wherein the variable that is related to the vehicle velocity is compared with a velocity threshold value which lies in a range of 1-3 kph.

19. A method comprising the steps of:
(a) providing a motor vehicle including a foot-force-actuable brake system having first and second brake circuits, each of the first and second brake circuits including at least two braking devices;
(b) sensing a manual actuation of the foot-force-actuable brake system;
(c) in response to the manual actuation of the foot-force-actuable brake system:
(1) applying hydraulic fluid pressure having a first magnitude that is related to the manual actuation of the foot-force-actuable brake system to the at least two braking devices of the first brake circuit;
(2) automatically applying hydraulic fluid pressure having the first magnitude to the at least two braking devices of the second brake circuit if a variable that is related to vehicle velocity is greater than a threshold value; and
(3) automatically applying hydraulic fluid pressure having a second magnitude that is less than the first magnitude to the at least two braking devices of the second brake circuit if the variable that is related to vehicle velocity is less than the threshold value.

* * * * *